(No Model.)
N. DAVIS.
FAUCET.
No. 423,596. Patented Mar. 18, 1890.
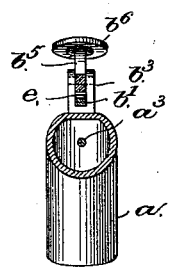
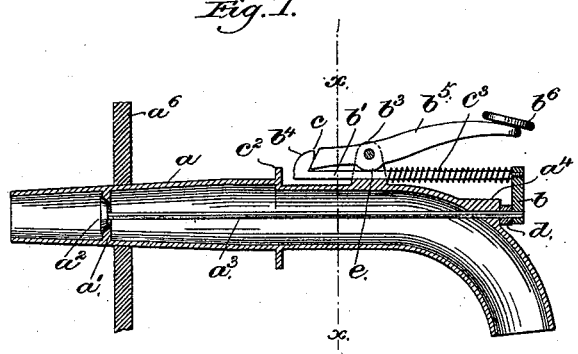

UNITED STATES PATENT OFFICE.

NATHANIEL DAVIS, OF SOMERVILLE, ASSIGNOR OF ONE-HALF TO GEORGE L. DAVIS, OF NORTH ANDOVER, MASSACHUSETTS.

FAUCET.

SPECIFICATION forming part of Letters Patent No. 423,596, dated March 18, 1890.

Application filed May 4, 1889. Serial No. 309,607. (No model.)

*To all whom it may concern:*

Be it known that I, NATHANIEL DAVIS, of Somerville, county of Middlesex, State of Massachusetts, have invented an Improvement in Faucets, of which the following description, in connection with the accompanying drawings, is a specification, like letters on the drawings representing like parts.

This invention has for its object to provide a novel faucet to be used with barrels, water-coolers, and other vessels for containing liquid.

My improved faucet is designed to be inserted into the barrel or receptacle, and is constructed so that the valve-seat will be within the barrel or receptacle, and the liquid in the faucet is thereby protected from external heat when the faucet is placed in operative position.

My invention therefore consists in a faucet consisting of a tube provided with a valve-seat, combined with a valve having its valve-stem extended through the said tube, a rod, a spring encircling said rod, and a finger-lever, and a lock for said lever, substantially as will be described.

Figure 1 is a longitudinal section of a faucet embodying my invention, a portion of the barrel or other liquid-receptacle being also shown; and Fig. 2, a sectional view of the faucet shown in Fig. 1 on line $x$ $x$, looking toward the right.

The faucet, tube, or pipe $a$, preferably of brass or other usual material, is provided on its inner side near one end with an annular flange $a'$, preferably beveled on one side or face to form a seat for a preferably conically-shaped disk-valve $a^2$. The valve $a^2$ has a valve-stem $a^3$, which is extended toward the discharge or outlet end of the faucet and through a hole in a boss $a^4$, secured to or forming part of the faucet. The boss $a^4$ is made of sufficient size to form a substantially-long bearing for the valve-stem, which is connected by a link $b$ to a rod $b'$, extended through a hole or passage in an upright $b^3$ toward the rear end of the faucet, the said rod being provided at its rear end with a cam $b^4$, which is engaged by the inclined or cam-shaped end of a finger-lever $b^5$, pivoted in the upright $b^3$. The finger-lever $b^5$ is provided with a finger-piece or cap $b^6$, by pressing upon which the said lever is turned on its pivot, and the inclined end of the said lever acts on the cam $b^4$ and moves the rod $b$ and the valve-stem $a^3$ and its attached valve $a^2$ toward the rear, thus removing the said valve from its seat and opening the valve, thereby permitting the liquid in the barrel or vessel to flow out and be discharged through the faucet. The cam $b^4$ has a portion of its inner face made straight, as at $c$, to form a lock for the finger-lever $b^5$, when the latter is depressed sufficiently to bring the end of the lever in contact with the straight face $c$ of the said cam, thus keeping the valve wide open after the pressure has been removed from the finger-piece. The movement of the rod $b'$ in the direction to open the valve is limited by a stop, herein shown as a flange $c^2$ on the faucet. The valve $a^2$ is seated, as shown, by a spiral spring $c^3$, encircling the rod $b'$ between the upright $b^3$ and the link $b$.

The valve stem or rod $a^3$ is provided, as shown, with a ring $d$, of rubber or other yielding material, to act as a packing to prevent the escape of liquid through the boss when under full pressure.

In practice the rear end of the faucet will be inserted into the barrel, cooler, or other receptacle a sufficient distance to bring the valve-seat within the said receptacle, so that the liquid remaining in the faucet is protected from external heat, and thereby that portion of the liquid which is first drawn off is as cool as the rest of the liquid in the receptacle.

The rod $b'$ is prevented from being lifted up by the end of the finger-lever when the finger-piece $b^6$ is pressed upon, preferably, by a projection $e$ on the under side of the said lever.

I claim—

The herein-described faucet, consisting of the tube $a$, provided with the valve-seat, combined with the valve having its valve-stem extended through the said tube, the rod $b'$, a spring encircling the rod $b'$, and a finger-lever, and a lock for said lever, substantially as described.

In testimony whereof I have signed my name to this specification in the presence of two subscribing witnesses.

NATHANIEL DAVIS.

Witnesses:
JAS. H. CHURCHILL,
M. RAY.